(12) United States Patent
Nishikawa

(10) Patent No.: US 8,893,896 B2
(45) Date of Patent: Nov. 25, 2014

(54) OIL STRAINER

(75) Inventor: Yukinobu Nishikawa, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 608 days.

(21) Appl. No.: 12/451,786

(22) PCT Filed: Apr. 13, 2009

(86) PCT No.: PCT/JP2009/057436
§ 371 (c)(1),
(2), (4) Date: Dec. 1, 2009

(87) PCT Pub. No.: WO2009/128420
PCT Pub. Date: Oct. 22, 2009

(65) Prior Publication Data
US 2010/0133164 A1 Jun. 3, 2010

(30) Foreign Application Priority Data
Apr. 17, 2008 (JP) ................. 2008-108151

(51) Int. Cl.
| B01D 35/02 | (2006.01) |
| B01D 35/027 | (2006.01) |
| B01D 29/15 | (2006.01) |
| F01M 11/00 | (2006.01) |
| F16H 57/04 | (2010.01) |

(52) U.S. Cl.
CPC .... B01D 35/0273 (2013.01); *B01D 2201/0415* (2013.01); *F01M 2011/007* (2013.01); F01M 11/0004 (2013.01); B01D 29/15 (2013.01); *F16H 57/0402* (2013.01)
USPC ........... 210/460; 210/232; 210/459; 210/461; 210/462; 123/196 R

(58) Field of Classification Search
USPC ............... 210/231, 232, 459–463; 123/196 R
See application file for complete search history.

(56) References Cited

U.S. PATENT DOCUMENTS 3,016,984 A * 1/1962 Getzin .......................... 55/492
4,014,796 A * 3/1977 Sugiyama et al. ............ 210/437
(Continued)

FOREIGN PATENT DOCUMENTS

| CN | 2480042 Y | 3/2002 |
| JP | U-60-188807 | 12/1985 |

(Continued)

OTHER PUBLICATIONS

International Search Report issued in International Application No. PCT/JP2009/057436 on Jul. 14, 2009.

(Continued)

*Primary Examiner* — Tony G Soohoo
*Assistant Examiner* — Peter Keyworth
(74) *Attorney, Agent, or Firm* — Oliff PLC

(57) ABSTRACT

An oil strainer is provided with a tube (41) for allowing oil to flow therethrough, a mesh (71) mounted to one end (41m) of the tube (41), a protector (61) connected to said end (41m) of the tube (41) so as to cover the mesh (71), and a bracket (51) for fixing the tube (41) to a surrounding member mounted around the oil strainer (31). The bracket (51) has a staking section (53) for staking the protector (61) and the tube (41) together. The above structure enhances productivity of the oil strainer and reduces costs of the oil strainer.

6 Claims, 6 Drawing Sheets

(56) References Cited

U.S. PATENT DOCUMENTS

| | | | | |
|---|---|---|---|---|
| 4,411,788 A | * | 10/1983 | Kimura | 210/439 |
| 4,518,177 A | * | 5/1985 | Deakins | 285/64 |
| 4,538,565 A | * | 9/1985 | Hidaka et al. | 123/196 R |
| 6,640,767 B2 | * | 11/2003 | Kato et al. | 123/195 C |
| 6,830,687 B2 | * | 12/2004 | Dockery et al. | 210/416.4 |
| 2008/0078712 A1 | * | 4/2008 | Enokida et al. | 210/167.02 |

FOREIGN PATENT DOCUMENTS

| | | |
|---|---|---|
| JP | U-61-143620 | 9/1986 |
| JP | A-62-277114 | 12/1987 |
| JP | A-02-108844 | 4/1990 |
| JP | U-04-106609 | 9/1992 |
| JP | A-05-023508 | 2/1993 |
| JP | A-09-010503 | 1/1997 |
| JP | A-11-280447 | 10/1999 |
| JP | A-2005-188673 | 7/2005 |

OTHER PUBLICATIONS

Jul. 20, 2011 Office Action issued in Chinese Application No. 200980000499.3 (with translation).

* cited by examiner

OIL STRAINER

TECHNICAL FIELD

The present invention relates generally to an oil strainer, and more specifically to an oil strainer formed by combining a plurality of parts.

BACKGROUND ART

In regard to conventional oil strainers, for example, Japanese Utility Model Laying-Open No. 61-143620 discloses an oil strainer for a car aiming to reduce weight and cost thereof (Patent Document 1). The oil strainer disclosed in Patent Document 1 includes a flange made of synthetic resin, a stepped ring, and a mesh filter body. A circumferential portion of the mesh filter body is caught by a circumferential portion of a lower surface of the flange and the stepped ring, and the flange and the stepped ring are subjected to ultrasonic welding, thereby fixing the mesh filter body.

Japanese Patent Laying-Open No. 11-280447 discloses an engine lubricant suction device aiming to simplify a structure thereof (Patent Document 2). The lubricant suction device disclosed in Patent Document 2 includes a pipe formed to have an open oil intake, and an oil screen formed from an aluminum plate with numerous holes and attached to cover the oil intake. The oil screen is inserted into the pipe in a cylindrically curved state, and secured by welding with an end portion of its outer peripheral surface being joined to an inner wall surface of the pipe.

Japanese Patent Laying-Open No. 5-23508 discloses an oil strainer in a hydraulic control system for an automatic transmission aiming to increase an area for adsorbing iron powders mixed in oil (Patent Document 3). The oil strainer disclosed in Patent Document 3 includes a strainer body, a mesh member fitted on an outer periphery of the strainer body, and a cap body fixedly attached to a lower portion of the strainer body and holding the mesh member.

PRIOR ART DOCUMENTS

Patent Documents

Patent Document 1: Japanese Utility Model Laying-Open No. 61-143620
Patent Document 2: Japanese Patent Laying-Open No. 11-280447
Patent Document 3: Japanese Patent Laying-Open No. 5-23508

SUMMARY OF THE INVENTION

Problems to be Solved by the Invention

In order to remove foreign objects mixed in oil, an oil strainer including a mesh filter body is employed. This oil strainer includes, in addition to the filter body, a plurality of parts such as a pipe member through which oil flows and a bracket for fixing the oil strainer to a surrounding member, and hence the parts need to be joined to one another. In the various types of oil strainers disclosed in the aforementioned patent documents, ultrasonic welding and other welding methods are used to join the parts to one another, and there is room for improvement in terms of productivity enhancement and cost reduction of the oil strainers.

Accordingly, an object of the present invention is to solve the aforementioned problems, and to provide an oil strainer achieving enhanced productivity and reduced cost.

Means for Solving the Problems

An oil strainer according to the present invention includes a pipe member through which oil flows, a filter body, a filter body protection member, and a fixing member. The filter body is disposed at one end of the pipe member. The filter body protection member is connected to the one end of the pipe member and provided to cover the filter body. The fixing member fixes the pipe member to a surrounding member disposed around an oil strainer. The fixing member includes a caulking portion for caulking the filter body protection member and the pipe member integrally.

According to the oil strainer formed in this manner, by providing the caulking portion in the fixing member, the filter body protection member, the pipe member and the fixing member can be joined together. Consequently, productivity of the oil strainer can be enhanced and manufacturing cost thereof can be reduced.

Preferably, the filter body protection member includes a tip end portion disposed on extension of the one end of the pipe member, and at least two brace portions extending from the tip end portion toward the one end of the pipe member. The filter body protection member is formed from a single plate material. According to the oil strainer formed in this manner, productivity of the filter body protection member can be further enhanced.

Preferably, a hole in which the one end of the pipe member is inserted is formed in the fixing member. The filter body protection member is caulked by the caulking portion with the brace portions being inserted in the hole. According to the oil strainer formed in this manner, the brace portions can be prevented from spreading outward, with a simple structure.

Preferably, the filter body is formed by winding a single mesh member in a cylindrical shape such that its opposing peripheral edges overlap each other. The oil strainer further includes a filter body supporting member disposed on an inner side of the filter body. A shape of the filter body is maintained by sandwiching the peripheral edges of the mesh member between the filter body supporting member and the filter body protection member. According to the oil strainer formed in this manner, a gap between the peripheral edges of the mesh member can be eliminated, thereby preventing entry of foreign objects.

Preferably, the filter body protection member includes a tip end portion disposed on extension of the one end of the pipe member. The filter body supporting member includes a pressing portion disposed on extension of the one end of the pipe member and overlapping the tip end portion. The filter body is sandwiched between the tip end portion and the pressing portion on extension of the one end of the pipe member. According to the oil strainer formed in this manner, a gap between the filter body and the filter body protection member can be eliminated on extension of the one end of the pipe member, thereby preventing entry of foreign objects.

Preferably, the filter body is caulked integrally with the filter body protection member and the pipe member by the caulking portion. According to the oil strainer formed in this manner, a gap between the filter body and the filter body protection member can be eliminated at the one end of the pipe member, thereby preventing entry of foreign objects.

Effects of the Invention

As described above, according to the present invention, an oil strainer achieving enhanced productivity and reduced cost can be provided.

MODES FOR CARRYING OUT THE INVENTION

Figure 1:
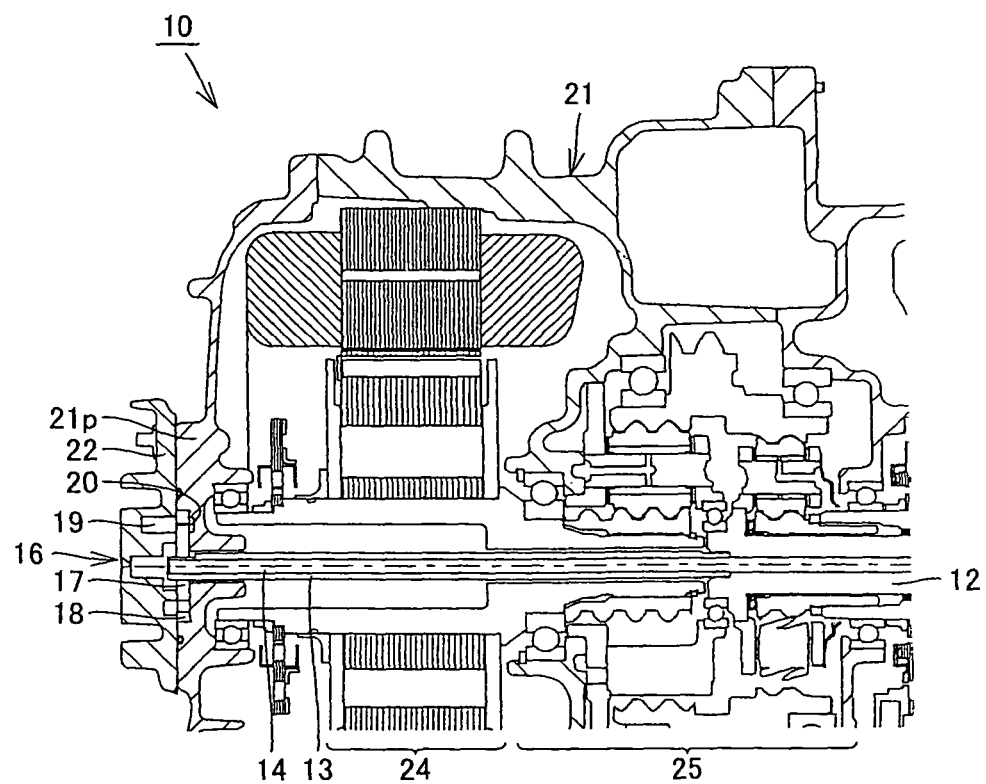
FIG. 1 is a cross-sectional view showing a transaxle for a vehicle.

Embodiments of the present invention will be described with reference to the drawings. It is noted that the same or corresponding members have the same numbers allotted in the drawings which will be referred to hereinafter.

Figure 2:
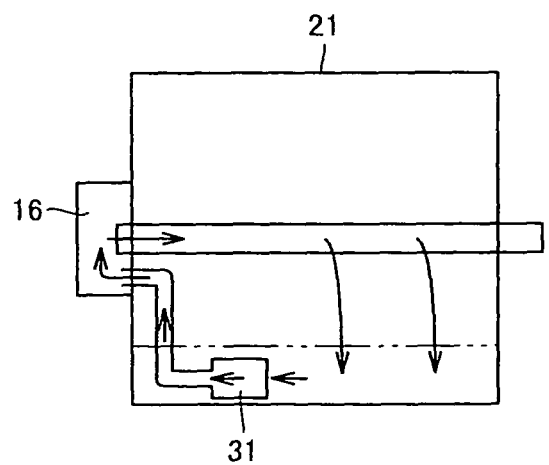
FIG. 2 is a cross-sectional view schematically illustrating an oil flow in the transaxle in FIG. 1.

FIG. 1 is a cross-sectional view showing a transaxle for a vehicle. FIG. 2 is a cross-sectional view schematically illustrating an oil flow in the transaxle in FIG. 1. In the present embodiment, by way of example, an oil strainer provided in the transaxle in FIG. 1 will be described.

Referring to FIGS. 1 and 2, a structure of a transaxle 10 will be described first. Transaxle 10 is mounted on a hybrid car having an internal combustion engine such as a gasoline engine or a diesel engine, and a motor supplied with electric power from a secondary battery (battery) that can be charged and discharge, as a power source.

Transaxle 10 includes an input shaft 12 for receiving power from the engine, a motor generator 24 for functioning as an electric motor or a power generator for running the vehicle, a power distribution mechanism 25 including a plurality of gears, for distributing power between the engine and motor generator 24, and a motor case 21 for accommodating input shaft 12, motor generator 24 and power distribution mechanism 25.

In transaxle 10, input shaft 12 is lubricated by driving a mechanical oil pump 16.

That is, rotation of input shaft 12 is transmitted via an oil pump drive shaft 13 fitted in input shaft 12 to an oil pump drive rotor 17 and an oil pump driven rotor 18. A case cover 21p constituting motor case 21 and an oil pump cover 22 attached to case cover 21p have a port 20 and a port 19 formed therein, respectively. As a result of rotation of oil pump drive rotor 17 and oil pump driven rotor 18, an oil pressure is generated between port 20 and port 19. Here, oil is supplied from ports 20 and 19 through a hollow portion 14 formed in oil pump drive shaft 13 to input shaft 12.

The oil supplied to input shaft 12 further lubricates the gears constituting power distribution mechanism 25, and then flows down to the bottom of motor case 21. The oil is stored at the bottom of motor case 21 at a prescribed level therefrom, and the stored oil is suctioned up by driving mechanical oil pump 16.

At the bottom of motor case 21, an oil strainer 31 in the present embodiment is provided while being immersed in the stored oil. Oil strainer 31 removes foreign objects mixed in the oil, thereby preventing damage to mechanical oil pump 16 and pump performance degradation.

Figure 3:
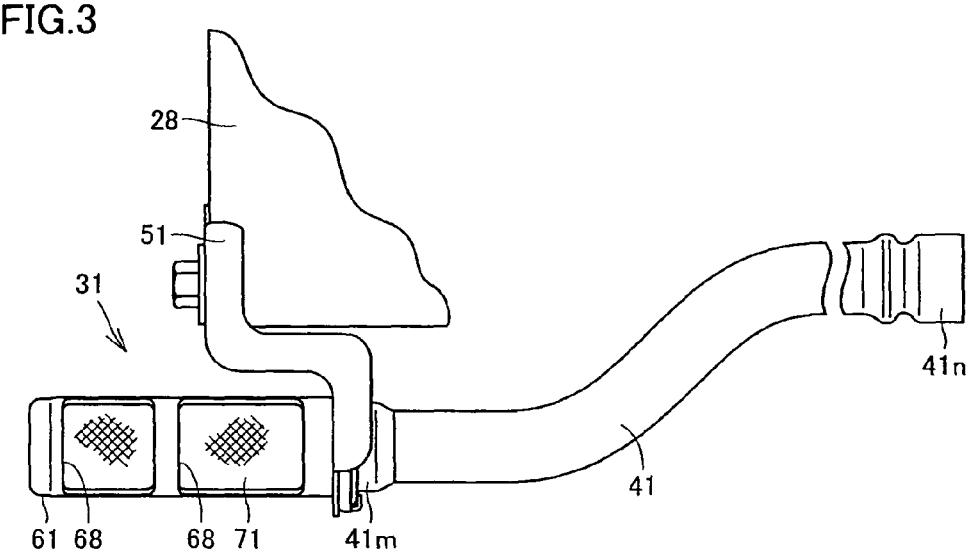
FIG. 3 is a plan view showing an oil strainer in FIG. 2.

Next, a structure of oil strainer 31 in the present embodiment will be described in detail. FIG. 3 is a plan view showing the oil strainer in FIG. 2. Referring to FIG. 3, oil strainer 31 is formed by combining a plurality of parts, and includes a tube 41, a bracket 51, a protector 61, and a mesh 71 as its components.

Figure 4:
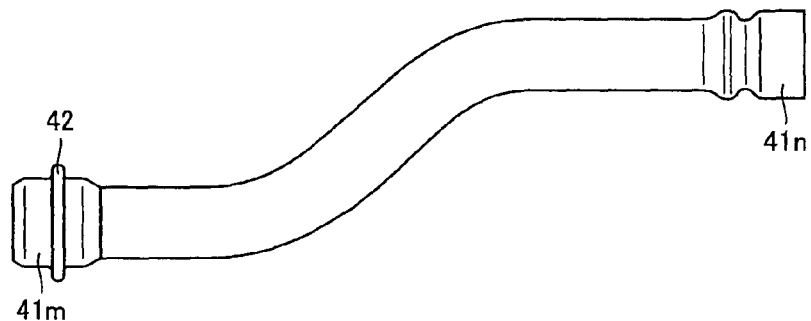
FIG. 4 is a plan view showing a tube in FIG. 3.

FIG. 4 is a plan view showing the tube in FIG. 3. Referring to FIGS. 3 and 4, tube 41 includes one end 41m and the other end 41n, and extends cylindrically between one end 41m and the other end 41n. On the inner side of tube 41, a space for the oil suctioned through mesh 71 to flow is formed. In the present embodiment, tube 41 is formed to be curved between one end 41m and the other end 41n.

Tube 41 is made of metal. Tube 41 has a flange portion 42. Flange portion 42 is formed to spread like a collar from a cylindrical outer circumferential surface of tube 41. Tube 41 is formed by subjecting a general-purpose pipe made of metal to a prescribed forming process.

Protector 61, bracket 51 and mesh 71 are disposed at one end 41m of tube 41. Protector 61 has a cylindrical shape with an opening 68. Mesh 71 is disposed on the inner side of protector 61 to close opening 68. A boss 28 is provided around oil strainer 31, and oil strainer 31 is fixed to boss 28 by means of bracket 51.

Figure 5:
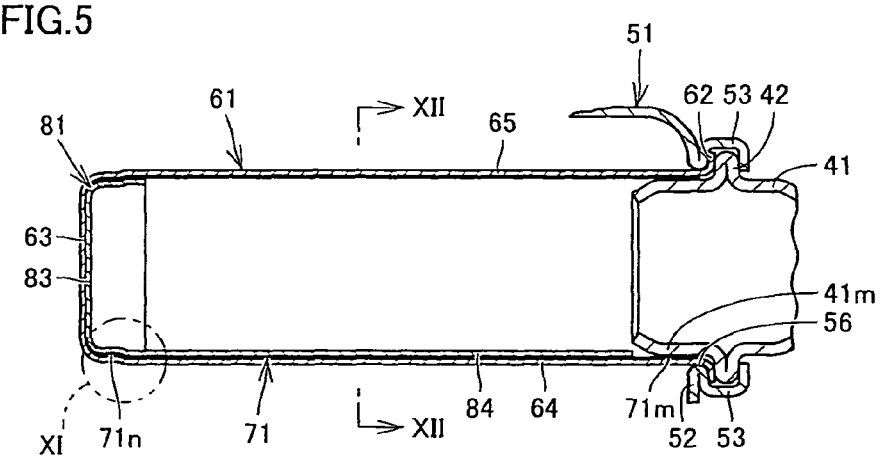
FIG. 5 is a cross-sectional view showing an oil suction portion of the oil strainer in FIG. 3.
Figure 6:
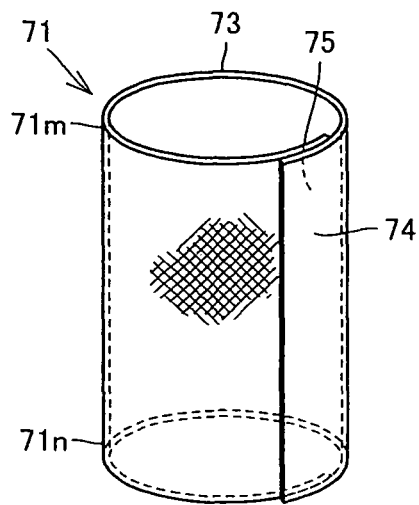
FIG. 6 is a perspective view showing a mesh in FIG. 3.

FIG. 5 is a cross-sectional view showing an oil suction portion of the oil strainer in FIG. 3. FIG. 6 is a perspective view showing the mesh in FIG. 3.

Referring to FIGS. 5 and 6, mesh 71 is formed from a flexible mesh member 73. A general-purpose filter such as a 60-mesh filter is used for mesh member 73. Mesh member 73 has a substantially rectangular shape when viewed two-dimensionally, and has a peripheral edge 74 and a peripheral edge 75 disposed at opposing sides of the rectangular shape. Mesh member 73 is wound in a cylindrical shape such that its peripheral edge 74 and peripheral edge 75 overlap each other.

Mesh 71 has one end 71m and the other end 71n at opposing ends in a direction of a cylindrically extending axis. Mesh 71 is connected to tube 41 such that mesh 71 and an internal space of tube 41 are in communication with each other. More specifically, one end 71m of mesh 71 is fitted on an outer periphery of the other end 71n of tube 41.

Figure 7:
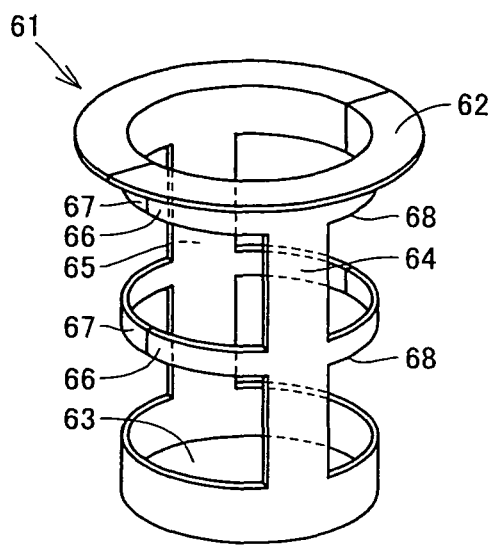
FIG. 7 is a perspective view showing a protector in FIG. 3.

FIG. 7 is a perspective view showing the protector in FIG. 3. Referring to FIGS. 5 and 7, protector 61 is made of metal. Protector 61 includes a tip end portion 63, a brace portion 64 and a brace portion 65 as its components.

Tip end portion 63 is disposed on extension of one end 41m of tube 41. Tip end portion 63 is formed to close cylindrical mesh 71 disposed on the inner side of protector 61 on the side of the other end 71n. Brace portion 64 and brace portion 65 extend from tip end portion 63 toward one end 41m of tube 41, in positions at a distance from each other in a circumferential direction. Opening 68 for the oil to flow through mesh 71 is formed between brace portion 64 and brace portion 65. Brace portion 64 and brace portion 65 are disposed on the outer circumference of tube 41.

Although protector 61 is provided with two brace portions 64 and 65 in the present embodiment, three or more brace portions may be provided.

Protector 61 further includes a rib-shaped portion 66 and a rib-shaped portion 67 as its components. Rib-shaped portion 66 extends from brace portion 64 toward brace portion 65 while being curved along a curve of mesh 71. Rib-shaped portion 67 extends from brace portion 65 toward brace portion 64 while being curved along the curve of mesh 71. Rib-shaped portion 66 and rib-shaped portion 67 abut each other in the circumferential direction in which each rib-shaped portion extends. It is assumed that during attachment of oil strainer 31, an operator fastens bracket 51 to boss 28 in FIG. 3 while holding protector 61. In this case, rib-shaped portion 66 and rib-shaped portion 67 are pressed against each other, thereby sufficiently ensuring strength of protector 61.

Protector 61 further includes a collar portion 62 as its component. Collar portion 62 is provided at a tip end to which brace portions 64 and 65 extend toward one end 41m of tube 41. Collar portion 62 is formed to spread like a collar from outer circumferential surfaces of rib-shaped portions 66 and 67. Collar portion 62 overlaps flange portion 42 with protector 61 being disposed at one end 41m of tube 41.

Figure 8:
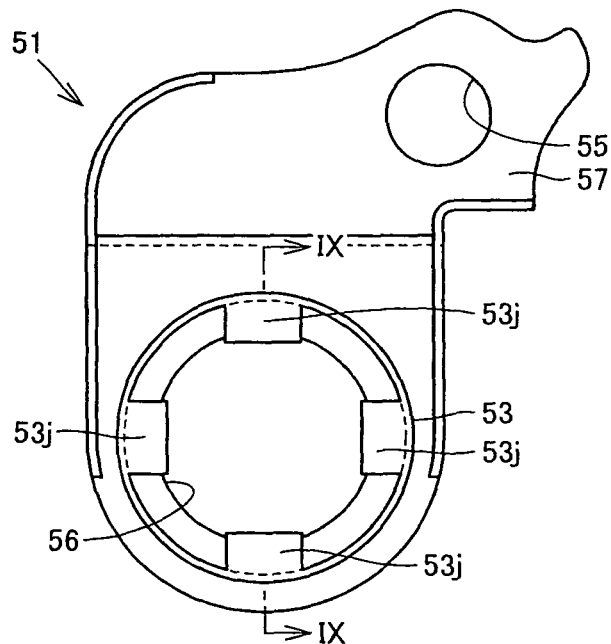
FIG. 8 is a front view showing a bracket in FIG. 3.
Figure 9:
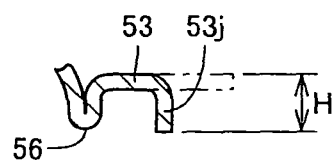
FIG. 9 is a cross-sectional view of the bracket along a line IX-IX in FIG. 8.
Figure 9:
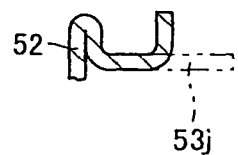

FIG. 8 is a front view showing the bracket in FIG. 3. FIG. 9 is a cross-sectional view of the bracket along a line IX-IX in FIG. 8. Referring to FIGS. 8 and 9, bracket 51 is made of metal. Bracket 51 includes a fixing portion 57, a cylinder portion 52 and a caulking portion 53 as its components.

A bolt hole 55 in which a fastening bolt is inserted is formed in fixing portion 57. Cylinder portion 52 has a cylindrically extending shape continuous from fixing portion 57, and defines an insertion hole 56 as a hole therein. Caulking portion 53 is formed to extend from cylinder portion 52 in an axial direction of insertion hole 56. Caulking portion 53 has a plurality of caulking pawls 53j plastically deformed by a not-shown die. The plurality of caulking pawls 53j are provided at a distance from one another in the circumferential direction when insertion hole 56 is viewed from the front.

Referring to FIG. 5, one end 41m of tube 41, one end 71m of mesh 71, and brace portions 64 and 65 of protector 61 are inserted in insertion hole 56. In this state, flange portion 42 of tube 41 and collar portion 62 of protector 61 are caulked integrally by caulking portion 53. Further, one end 71m of mesh 71 is caulked while it is sandwiched between one end 41m of tube 41 and brace portions 64 and 65 of protector 61.

In this manner, in the present embodiment, tube 41, protector 61 and mesh 71 are caulked integrally by caulking portion 53 of bracket 51. In this case, as compared to an example where the respective parts are integrated by welding and the like, productivity of oil strainer 31 is enhanced and manufacturing cost thereof can be reduced. Moreover, extraction strength of tube 41, protector 61 and mesh 71 with respect to bracket 51 can be ensured through an area for caulking (a height H of caulking pawl 53j in FIG. 9), which leads to quality control easier than in an example where tests are conducted with actual application of external force. Furthermore, since caulking is performed with a prescribed die, oil strainer 31 rarely varies in quality.

Figure 10:
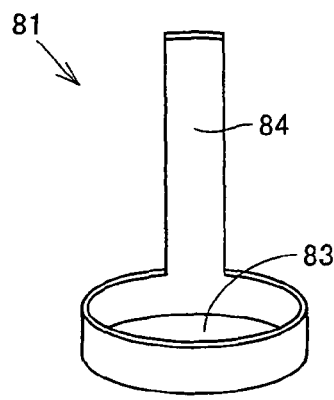
FIG. 10 is a perspective view showing a patch in FIG. 5.
Figure 11:
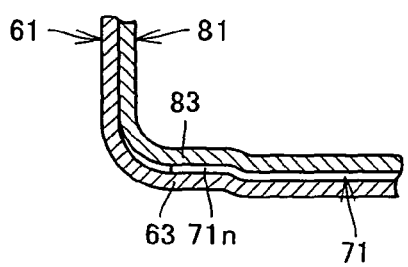
FIG. 11 is an enlarged cross-sectional view of an area encircled with a chain-double-dotted line XI in FIG. 5.

Next, a structure of oil strainer 31 in FIG. 5 for preventing foreign objects from entering tube 41 will be described. FIG. 10 is a perspective view showing a patch in FIG. 5. FIG. 11 is an enlarged cross-sectional view of an area encircled with a chain-double-dotted line XI in FIG. 5.

Referring to FIGS. 5, 10 and 11, oil strainer 31 further includes a patch (backing plate) 81 serving as a filter body supporting member as its component. Patch 81 is disposed on the inner side of mesh 71 having a cylindrical shape.

Patch 81 includes a pressing portion 83 and a brace portion 84 as its components. Pressing portion 83 is disposed on extension of one end 41m of tube 41. Pressing portion 83 overlaps tip end portion 63 of protector 61. Brace portion 84 extends from pressing portion 83 toward one end 41m of tube 41. The other end 71n of mesh 71 is sandwiched between pressing portion 83 and tip end portion 63.

In the present embodiment, one end 71m of mesh 71 having a cylindrical shape is caulked while it is sandwiched between one end 41m of tube 41 and protector 61, and the other end 71n of mesh 71 is sandwiched between pressing portion 83 of patch 81 and tip end portion 63 of protector 61. With this arrangement, a gap between mesh 71 and protector 61 can be eliminated on one end 71m and the other end 71n of mesh 71, thereby reliably preventing entry of foreign objects.

Figure 12:
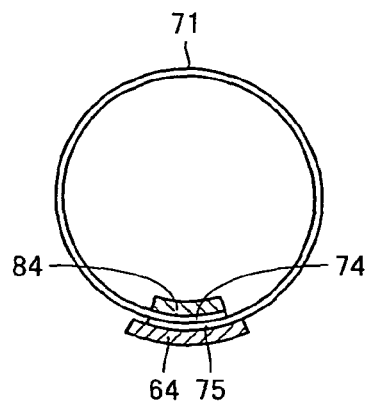
FIG. 12 is a cross-sectional view of the oil strainer along a line XII-XII in FIG. 5.

FIG. 12 is a cross-sectional view of the oil strainer along a line XII-XII in FIG. 5. Referring to FIGS. 5 and 12, peripheral edge 74 and peripheral edge 75 of mesh 71 overlapping each other are sandwiched by brace portion 84 of patch 81 and brace portion 64 of protector 61. With this arrangement, a gap between peripheral edge 74 and peripheral edge 75 can be eliminated, thereby reliably preventing entry of foreign objects.

Although not shown, brace portion 64 and brace portion 84 are coupled to each other by spot welding or the like, for example.

Figure 13:
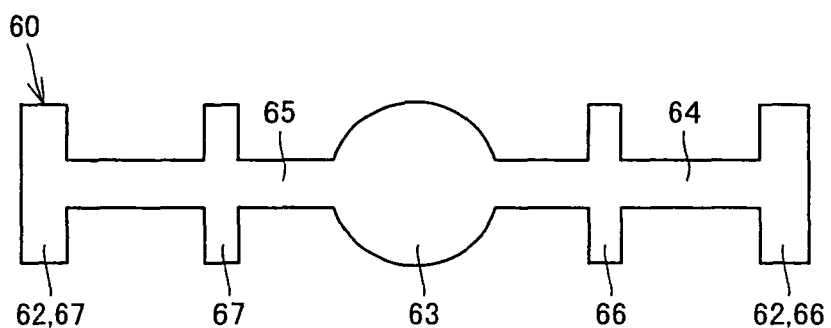
FIG. 13 is a plan view showing a material of the protector in FIG. 3.

FIG. 13 is a plan view showing a material of the protector in FIG. 3. Referring to FIG. 13, in the present embodiment, protector 61 is formed by subjecting a metal plate 60 as one flat plate material to prescribed cutting process and forming process (a drawing process, a bending process). Likewise, bracket 51 in FIG. 8 and patch 81 in FIG. 10 are also formed by subjecting one metal plate to prescribed cutting process and forming process. Protector 61, bracket 51 and patch 81 can be manufactured through progressive press-working steps. In this case, once a press die is produced, each part can be mass-produced with reduced variation in shape. Additionally, for example, pieces of metal plates left over from manufacture of bracket 51 can be utilized to manufacture other parts, which leads to cost reduction.

In the present embodiment, the components of oil strainer 31 are formed from a metal plate or a general-purpose pipe or filter. That is, oil strainer 31 is manufactured without using resin. This allows easy manufacture of oil strainer 31, and is advantageous in terms of productivity and cost as compared to an example using resin. Further, a problem of age deterioration is less likely, owing to the use of a metal plate.

Oil strainer 31 in the embodiment of the present invention includes tube 41 as a pipe member through which oil flows, mesh 71 as a filter body disposed at one end 41m of tube 41, protector 61 as a filter body protection member connected to one end 41m of tube 41 and provided to cover mesh 71, and bracket 51 as a fixing member for fixing tube 41 to boss 28 serving as a surrounding member disposed around oil strainer 31. Bracket 51 includes caulking portion 53 for caulking protector 61 and tube 41 integrally.

According to oil strainer 31 thus formed in the embodiment of the present invention, an oil strainer sufficiently achieving a function of preventing entry of foreign objects can be implemented with a simple structure. As a result, productivity of oil strainer 31 can be enhanced and manufacturing cost thereof can be reduced.

Although the structure of oil strainer 31 has been described by referring to transaxle 10 for a hybrid car by way of example in the present embodiment, the present invention is not limited as such, and is also applicable to an oil strainer used in a transmission and an engine part, for example.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The present invention is mainly employed for an oil strainer used in a transaxle, a transmission and an engine part of a car.

DESCRIPTION OF THE REFERENCE SIGNS

28 boss; 31 oil strainer; 41 tube; 41*m* one end; 51 bracket; 53 caulking portion; 56 insertion hole; 60 metal plate; 61 protector; 63 tip end portion; 64, 65 brace portion; 71 mesh; 73 mesh member; 74, 75 peripheral edge; 81 patch; 83 pressing portion.

The invention claimed is:

1. An oil strainer comprising:
   a pipe member through which oil flows;
   a filter body disposed at one end of said pipe member;
   a filter body protection member connected to the one end of said pipe member and provided to cover said filter body;
   a surrounding member disposed around the oil strainer; and
   a fixing member made of metal and extending between said surrounding member and said pipe member, that fixes said pipe member to said surrounding member,
   said fixing member including a caulking portion for caulking said filter body protection member and said pipe member integrally by plastic deformation of the metal,
   overlapping portions of said filter body protection member and said pipe member being sandwiched by said caulking portion
   wherein the overlapping portions of said filter body protection member and said pipe member include (i) a collar portion of said filter body protection member that extends substantially perpendicularly from filter body protection member and (ii) a flange portion of said pipe member that extends substantially perpendicularly from the pipe member, and (i) a first part of said caulking portion, (ii) the collar portion, (iii) the flange portion and (iv) a second part of said caulking portion lie on a same line, the collar portion and the flange portion being between the first and second parts of said caulking portion.

2. The oil strainer according to claim 1, wherein
   said filter body protection member includes a tip end portion disposed on extension of the one end of said pipe member, and at least two brace portions extending from said tip end portion toward the one end of said pipe member, and is formed from a single plate material.

3. The oil strainer according to claim 2, wherein
   a hole in which the one end of said pipe member is inserted is formed in said fixing member, and
   said filter body protection member is caulked by said caulking portion with said brace portions being inserted in said hole.

4. The oil strainer according to claim 1, wherein
   said filter body is formed by a single mesh member wound in a cylindrical shape such that its opposing peripheral edges overlap each other,
   said oil strainer further comprises a filter body supporting member disposed on an inner side of said filter body, and
   a shape of said filter body is maintained by sandwiching said peripheral edges between said filter body supporting member and said filter body protection member.

5. The oil strainer according to claim 4, wherein
   said filter body protection member includes a tip end portion disposed on extension of the one end of said pipe member,
   said filter body supporting member includes a pressing portion disposed on extension of the one end of said pipe member and overlapping said tip end portion, and
   said filter body is sandwiched between said tip end portion and said pressing portion on extension of the one end of said pipe member.

6. The oil strainer according to claim 1, wherein
   said filter body is caulked integrally with said filter body protection member and said pipe member by said caulking portion.

* * * * *